May 3, 1960
J. E. TROYAN
2,935,451
PROCESS FOR RECOVERING AMMONIA FROM A
RASCHIG SYNTHESIS REACTION
Filed Aug. 18, 1953
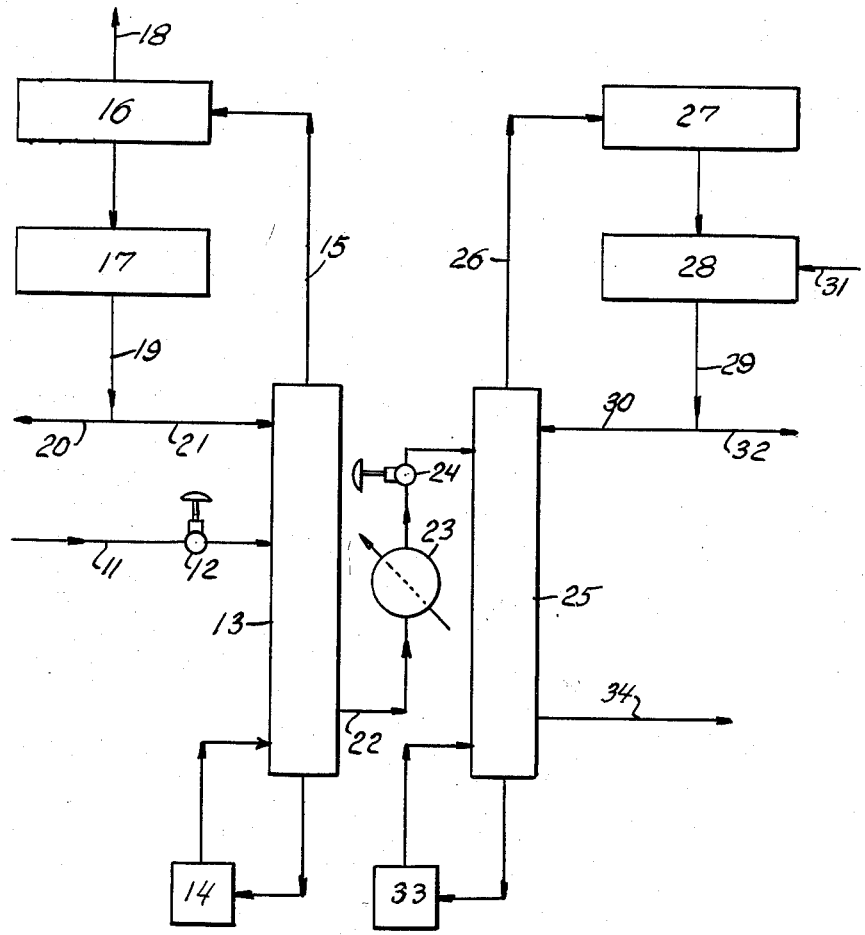
INVENTOR
JAMES E. TROYAN
BY
Adams, Forward and McLean
ATTORNEYS 2,935,451
Patented May 3, 1960

2,935,451
PROCESS FOR RECOVERING AMMONIA FROM A RASCHIG SYNTHESIS REACTION

James E. Troyan, Towson, Md., assignor to Olin Mathieson Chemical Corporation, a corporation of Virginia Application August 18, 1953, Serial No. 375,027

6 Claims. (Cl. 202—40)

My invention relates to improvements in the Raschig synthesis of hydrazine. More particularly my invention relates to improvements in the recovery of the excess ammonia used in the reaction.

In one modification of the Raschig synthesis of hydrazine, an aqueous solution of chloroamine is usually formed from a hypochlorite, usually aqueous sodium hypochlorite, and aqueous ammonia. The chloroamine is converted by means of a large excess of ammonia to hydrazine and sodium chloride. It is advantageous to use an excess of ammonia of the order of 30 to 50 moles of ammonia per mole of chloroamine. Obviously in any commercial process such ammonia must be recovered and recycled.

In a particularly useful form of the Raschig synthesis, as described more in detail in Nicolaisen application Serial No. 218,212, filed March 29, 1951, now abandoned, liquid ammonia and gaseous ammonia are dissolved in the aqueous chloroamine solution and the mixture is rapidly heated to 125 to 155° C. under pressures of from 300 to 450 p.s.i.g. These conditions are maintained for a short reaction time and the solution is processed for the recovery of hydrazine.

The process of my invention operates on the reaction liquor from the synthesis which is charged to the system of the present invention at a substantial superatmospheric pressure, preferably from about 140 to 160 p.s.i.g., and at a temperature of about 125° to 155° C. A substantial proportion of the excess ammonia, generally from about 40 to 60 percent, is removed in a first pressure distillation tower in the form of a product which consists essentially of ammonia and a small proportion of water, preferably from about 90 to 95 percent of ammonia and 10 to 5 percent of water by weight. The bottoms from the first distillation tower are introduced at a substantially lower pressure, generally from about 0 to 20 p.s.i.g., into a second distillation tower from which substantially anhydrous ammonia is removed overhead and a substantially ammonia-free aqueous solution of hydrazine and sodium chloride is obtained as bottoms. These bottoms are further processed in accordance with known means for the recovery of hydrazine.

It is an essential feature of my invention that the bottom temperatures in these columns shall not exceed about 155° C. The decomposition of hydrazine even in dilute aqueous solution becomes excessive at higher temperatures and serious losses of hydrazine occur.

The process of my invention will be further explained in connection with the attached drawing.

Synthesis liquor comprising principally ammonia, water, hydrazine and sodium chloride from the synthesis reactor is charged by line 11 through a reducing valve 12 to the primary fractionating column 13 at a pressure of 150 p.s.i.g. A bottom temperature of about 150° C. is maintained by means of reboiler 14 and approximately 95 percent ammonia-5 percent water is taken overhead at a temperature of 80–85° C. and a pressure of 150 p.s.i.g. It passes by line 15 through ammonia condenser 16 and is accumulated in drum 17. The condenser is provided with a vent 18 for uncondensed gases. A portion of the 95 percent ammonia is removed from storage drum 17 by line 19 for return to the synthesis reaction by line 20 and the remainder is utilized as reflux for the primary fractionating tower by line 21.

Bottoms from the primary fractionating tower pass by line 22 through a cooler 23 and a pressure reducing valve 24 and are fed to the top of the secondary column 25. Operating at 15 p.s.i.g., the column delivers anhydrous ammonia boiling at about −15° C., as an overhead product by line 26 which is accumulated in drum 27. The anhydrous ammonia is compressed and stored as liquid ammonia in compressor and storage plant 28 from which liquid ammonia for use as reflux to the secondary column is removed by lines 29 and 30. Ammonia used in the synthesis and converted to hydrazine is replaced by charging ammonia through the ammonia storage plant 28 by means of line 31 and anhydrous ammonia not desired as reflux to column 25 can be introduced into the aqua ammonia make-up tank (not shown) for the manufacture of chloroamine by means of line 32. A bottom temperature of about 130° C. is maintained in the secondary tower by reboiler 33 and the bottoms comprising substantially ammonia-free aqueous hydrazine containing sodium chloride is removed by line 34, for processing to recover hydrazine.

The interstage cooler 23 can be eliminated as non-essential, but its use is advantageous in that, although it increases the load on the reboiler for the secondary column, it decreases the reflux load on the column which is supplied by means of the relatively expensive liquid ammonia. It is more economical to supply additional steam to the reboiler and to operate the interstage cooler with ordinary cooling water.

The process of my invention has the advantage of important economies over the reduction of pressure to atmospheric from that of the synthesis reactor and recovery of ammonia at atmospheric pressure. In the latter case relatively expensive liquid ammonia refrigerant is required. About half of the excess ammonia is recovered in the present process under such pressures that it can be condensed with ordinary cooling water and is sufficiently free from water to be directly useful in the synthesis step.

I claim:
1. In the recovery of excess ammonia from a Raschig mixture which is at a substantial superatmospheric pressure, which has been prepared by reacting aqueous chloroamine solution and a large excess of ammonia and which contains hydrazine, sodium chloride, water and excess ammonia, the steps of fractionally distilling said mixture in a first stage at a substantial superatmospheric pressure to provide an overhead consisting essentially of ammonia and a small proportion of water and a bottoms consisting essentially of ammonia, hydrazine, sodium chloride and water, and thereafter fractionally distilling the bottoms in a second stage at substantially lower pressures than in the first stage to provide an overhead consisting essentially of anhydrous ammonia and a bottoms consisting essentially of hydrazine, sodium chloride and water, the bottoms temperature in each distillation stage not exceeding about 155° C.

2. The method of claim 1 wherein said mixture is fed to the first stage at a temperature of about 125° to 155° C.

3. The method of claim 2 wherein the bottoms from the first stage are cooled before introduction into the second stage.

4. In the recovery of excess ammonia from a Raschig mixture which is at a substantial superatmospheric pressure, which has been prepared by reacting an aqueous chloroamine solution and a large excess of ammonia and which contains hydrazine, sodium chloride, water and excess ammonia, the steps of fractionally distilling said mixture in a first stage at a pressure within the range from about 140 to 160 p.s.i.g. to provide an overhead containing from about 40 to 60 percent of the ammonia present in said mixture and consisting essentially of from about 90 to about 95 percent by weight of ammonia and about 10 to 5 percent by weight of water and a bottoms consisting essentially of ammonia, hydrazine, sodium chloride and water, and thereafter fractionally distilling the bottoms in a second stage at a pressure of from about 0 to 20 p.s.i.g. to provide an overhead consisting essentially of anhydrous ammonia and a bottoms consisting essentially of hydrazine, sodium chloride and water, the bottoms temperature in each distillation stage not exceeding about 155° C.

5. The method of claim 4 wherein said mixture is fed to the first stage at a temperature of about 125° to 155° C.

6. The method of claim 5 wherein the bottoms from the first stage are cooled before introduction into the second stage.

References Cited in the file of this patent

UNITED STATES PATENTS

| | | |
|---|---|---|
| 1,480,166 | Joyner | Jan. 8, 1924 |
| 1,875,774 | Swallen et al. | Sept. 6, 1932 |
| 2,071,301 | Herold et al. | Feb. 16, 1937 |
| 2,091,630 | Fenske et al. | Aug. 31, 1937 |
| 2,152,164 | Wentworth | Mar. 28, 1939 |
| 2,519,451 | Fulton | Aug. 22, 1950 |
| 2,583,585 | Marshall | Jan. 29, 1952 |
| 2,675,298 | Weiler et al. | Apr. 13, 1954 |
| 2,725,342 | Lambert | Nov. 29, 1955 |

OTHER REFERENCES

The Chemistry of Hydrazine, by Audrieth and Mohr, Chemical and Engineering News, vol. 26, No. 50, December 13, 1948, pp. 3746–3749 relied on.